US011012249B2

(12) United States Patent
Velayutham et al.

(10) Patent No.: US 11,012,249 B2
(45) Date of Patent: May 18, 2021

(54) CONTENT FEATURE BASED VIDEO STREAM SUBSCRIPTIONS

(71) Applicant: Microsoft Technology Licensing, LLC, Redmond, WA (US)

(72) Inventors: Senthil K. Velayutham, Sammamish, WA (US); Arash Ghanaie-Sichanie, Woodinville, WA (US); Ross Garrett Cutler, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/653,197

(22) Filed: Oct. 15, 2019

(65) Prior Publication Data
US 2021/0111916 A1    Apr. 15, 2021

(51) Int. Cl.
*G06F 15/16* (2006.01)
*H04L 12/18* (2006.01)
*H04N 7/14* (2006.01)
*H04N 7/15* (2006.01)

(52) U.S. Cl.
CPC ...... *H04L 12/1827* (2013.01); *H04L 12/1818* (2013.01); *H04L 12/1822* (2013.01); *H04N 7/147* (2013.01); *H04N 7/152* (2013.01)

(58) Field of Classification Search
None
See application file for complete search history.

(56) References Cited

U.S. PATENT DOCUMENTS

| 7,171,056 | B2 | 1/2007 | Zhang et al. |
| 8,890,923 | B2 | 11/2014 | Tian et al. |
| 9,300,912 | B2 | 3/2016 | Taneja et al. |
| 9,743,042 | B1 | 8/2017 | Faulkner |
| 9,756,286 | B1* | 9/2017 | Faulkner ............... H04L 65/403 |
| 9,819,905 | B1* | 11/2017 | Breitbard ............. H04L 65/601 |
| 2006/0031291 | A1 | 2/2006 | Beckemeyer |
| 2009/0210491 | A1 | 8/2009 | Thakkar et al. |
| 2010/0149305 | A1* | 6/2010 | Catchpole .......... G06K 9/00288 |
| | | | 348/14.08 |
| 2010/0315484 | A1 | 12/2010 | Ramanathan et al. |
| 2011/0292162 | A1 | 12/2011 | Byun et al. |

(Continued)

OTHER PUBLICATIONS

Mclellan, Charles, "Meeting Owl Review: Putting Remote Workers in the Video Conferencing Picture", Retrieved from: https://www.zdnet.com/product/meeting-owl/, Jul. 25, 2018, 11 Pages.

(Continued)

*Primary Examiner* — Phyllis A Book
(74) *Attorney, Agent, or Firm* — Schwegman Lundberg & Woessner, P.A.

(57) ABSTRACT

Disclosed in some examples are devices, systems, methods, and machine-readable mediums which provide for a network-based communication service that allows users in a network-based communication session to subscribe to video streams of the communication session that are of interest by subscribing to content features of those video streams rather than the video streams themselves. Content features may be any object in the video stream that is recognized by applying an image processing algorithm to one or more video frames. Example content features may include recognized users and/or other recognized objects.

20 Claims, 8 Drawing Sheets

(56) References Cited

U.S. PATENT DOCUMENTS

| | | | |
|---|---|---|---|
| 2013/0198298 A1* | 8/2013 | Li ...................... | H04N 21/4307 |
| | | | 709/206 |
| 2014/0100993 A1* | 4/2014 | Farmer .............. | G06Q 30/0277 |
| | | | 705/27.1 |
| 2016/0292884 A1 | 10/2016 | Schnittman et al. | |
| 2017/0366366 A1* | 12/2017 | Clavel .................. | G06F 3/0481 |
| 2019/0028419 A1* | 1/2019 | Sullivan .................. | H04L 51/02 |
| 2019/0058686 A1* | 2/2019 | Savenok ............... | G06Q 50/01 |
| 2019/0260965 A1* | 8/2019 | Morabia ............... | H04L 65/403 |
| 2019/0297304 A1* | 9/2019 | Li .......................... | G06F 3/013 |
| 2020/0134298 A1* | 4/2020 | Zavesky ................. | A63F 13/67 |
| 2020/0184965 A1* | 6/2020 | Costa Villas Boas Segura ........... | |
| | | | H04L 12/1822 |

OTHER PUBLICATIONS

"Quickly See How the Meeting Owl Works", Retrieved from: https://www.owllabs.com/how-it-works, Retrieved Date: Sep. 11, 2019, 5 Pages.

"Dolby Voice Room", Retrieved from: https://www.dolby.com/us/en/professional/products/dolby-voice-room.html, Aug. 14, 2019, 9 Pages.

Busso, et al., "Smart Room: Participant and Speaker Localization and Identification", In Proceedings of IEEE International Conference on Acoustics, Speech, and Signal Processing, Mar. 23, 2005, 4 Pages.

Hovin, Martin, "Building tools for teams: the AI technology behind our automated user experiences", Retrieved from: https://www.huddly.com/blog/building-tools-for-teams-the-ai-technology-behind-our-automated-user-experiences/, Jul. 1, 2019, 6 Pages.

"International Search Report and Written Opinion issued in PCT Application No. PCT/US20/052349", dated Jan. 29, 2021, 11 Pages.

* cited by examiner

CONTENT FEATURE BASED VIDEO STREAM SUBSCRIPTIONS

BACKGROUND

Network-based communication services provide a multitude of users in different geographic areas with tools to more effectively communicate with each other. The network-based communication service may provide features such as audio communications, video communications, chat features, file sharing, message board features, and the like. One feature provided by network-based communication services is a network-based communication session (e.g., an online meeting) where two or more users may meet and communicate in real-time with each other.

During a network-based communication session, users may exchange live audio, video, and/or may share other content such as pre-recorded audio, pre-recorded video, application data, screen sharing, and the like. In some examples, live video captured by a video capture device in a same room as the user may be shared with other participants of the network-based communication session. The video stream created by this capture device and shared with the other participants may show a live image of users, images of objects in the same room as the user (such as a whiteboard), and the like. Because of the plethora of sharing options during these network-based communication sessions, these sessions provide a productive way for users in different geographic regions to meet and exchange ideas that increases productivity over telephone sessions because users can visually see the reactions of other users, share content, and engage in a meeting experience that are similar to a face-to-face meeting.

Despite these benefits, there are still several issues with current network-based communication sessions. For example, consider a large communication session including both remote users and a number of users physically present in a single room. Oftentimes all the users in the room will be captured from a single camera. Remote users may not be interested in viewing all the users in the room, but may instead be interested in tracking and viewing a single user (even a non-speaking user) to view that single user's reactions, emotions, and interactions during the meeting.

Additionally, if a meeting has many remote users, each may have their own independent video streams from their respective capture devices, and it may be difficult for users to track and view the other users and/or objects that are of interest. Users may be overwhelmed by the shear volume of streaming video feeds available and may have trouble managing those feeds. Moreover, the video streams that are of interest may change over time dynamically so that users may have to constantly adjust the position and selection of these feeds.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
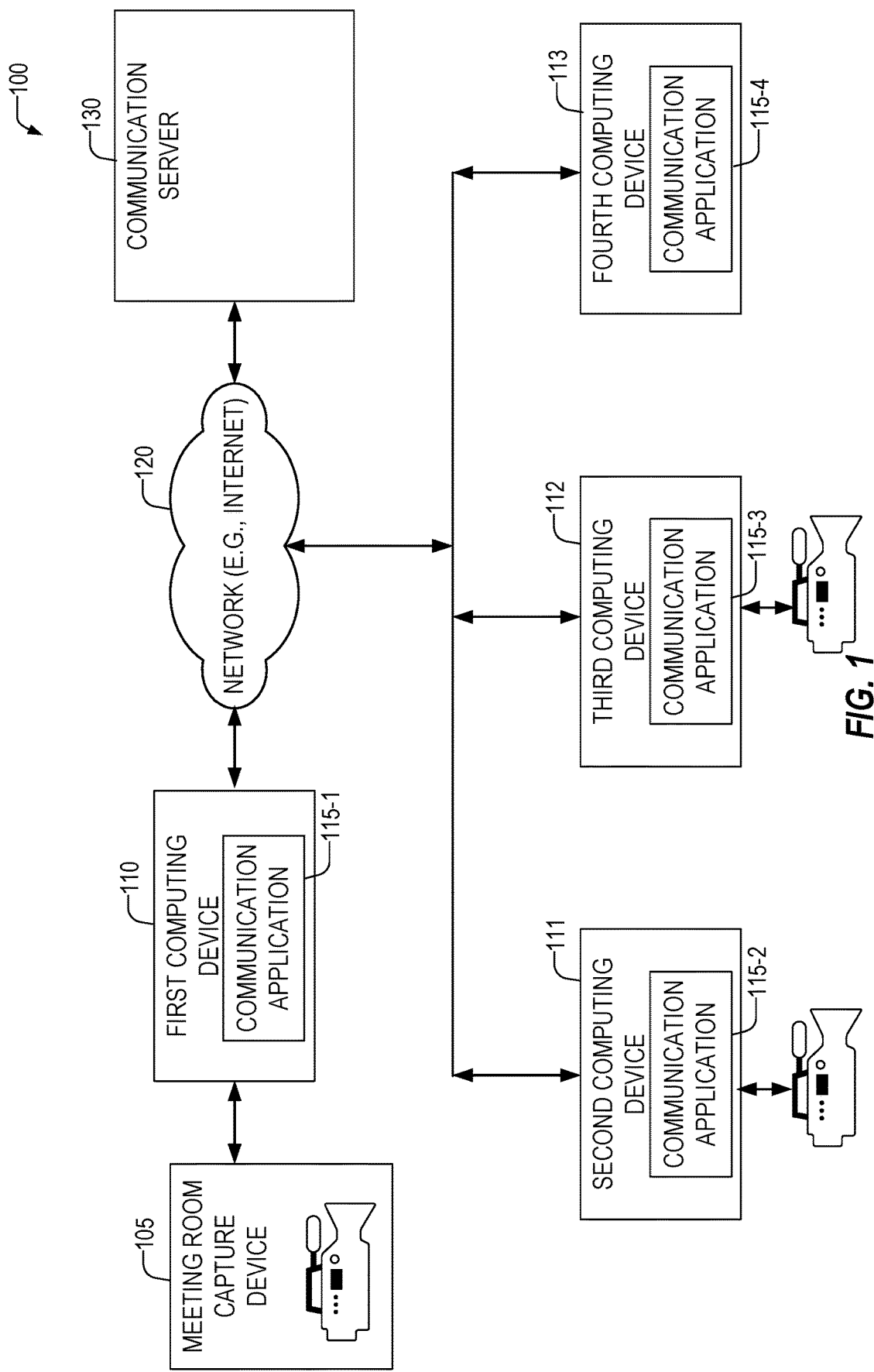
FIG. 1 shows a block diagram of an example network-based communication service according to some examples of the present disclosure.

Disclosed in some examples are devices, systems, methods, and machine-readable mediums which provide for a network-based communication service that allows users in a network-based communication session to subscribe to video streams of the communication session that are of interest by subscribing to content features of those video streams rather than the video streams themselves. Content features may be any object in the video stream that is recognized by applying an image processing algorithm to one or more video frames. Example content features may include recognized users and/or other recognized objects. For example, the system may employ facial recognition methods to identify users present in video streams of the network-based communication session. Similarly, other object recognition methods may be applied to the video streams to detect one or more non-person objects shown in the video streams. Example non-person objects may include whiteboards, writing surfaces, easels, chalkboards, three dimensional objects, and the like. Users may then subscribe to receive video streams based upon these recognized content features. The subscribed content features may then be streamed to the subscribing user regardless of which video stream the content features appear in during the network-based communication session.

In some examples, users may subscribe to particular groups in order to receive all video streams showing recognized content features that belong in the particular groups. Groups associated with recognized persons may include groups based upon a corporate structure (e.g., a division, a sector, a department or the like from a corporate directory), social network data (e.g., connections based upon a social graph), or the like. A subscription to a group of persons delivers all video streams showing a recognized person that is a member of the subscribed group.

Groups associated with non-person objects may be based upon a category of the object. For example, a drawing surfaces group may include objects such as whiteboards, chalkboards, easels with paper, and the like. A subscription to a drawing surfaces group may deliver all video streams showing a drawing surface to the subscribing user. The various groups may be defined by an administrator using a database, a directory database, third party sources, or the like.

As an example, a first user may subscribe to video streams showing a second user by selecting information about the second user (e.g., the second user's name) rather than selecting a particular video stream. In another example, a first user may select from a list of recognized objects in the one or more video streams. For example, a whiteboard, a chalkboard, an easel, a product demonstration, or the like. Stated generally, the subscription is chosen based upon the content features of the video stream (e.g., detected objects and/or recognized persons), or groups of content features, rather than a selection of a specific video stream itself.

In the example where a first user subscribes to receive a video stream showing a second user (either directly or via subscribing to a group where the second user is a member), video streams where the second user are shown will be streamed to the first user regardless of which video stream the second user appears in. If the second user initially appears in a first video stream, that first video stream is sent to the first user. If the second user moves from the first video stream to a second video stream (e.g., perhaps the user walks in view of a different camera), the first video stream may no longer be sent to the first user and instead the second video stream may be sent.

In some examples, only video streams that include subscribed users or groups of users are transmitted to the first user and other streams are not transmitted to the first user (but may be transmitted to other users that subscribed to them). In other examples, the streams that do not include one of the subscribed users or groups of users may be transmitted to the first user but are not displayed by a communication client executing the network-based communication service.

In some examples where a video stream may have multiple recognized users, the video stream may be split into a group of two or more video streams, one stream showing each recognized individual. For example, in a meeting room, a single camera may capture multiple users and/or objects. The system may recognize each user and split the video stream into a set of multiple video streams. In some examples, the splitting may be performed in a communication server and/or a communication application of a client device. In some examples, each video in the set shows a different recognized user. Each video may show a portrait view—which may be a head and shoulders view of the person or may show their entire body (or as much of the person's body as is visible in the video stream).

In some examples, users may subscribe to receive video streams of individual users and/or objects based upon a list of all the recognized users and/or objects in the available video streams of the network-based communication session. The list of recognized content features (such as users or objects) may be determined from facial recognition and object recognition by processing video streams of the network-based communication session. Facial recognition and object recognition may occur either at one or more communication clients, a network-based communication server, or both the one or more communication clients and the network-based communication server.

For example, a communication client may receive all the video streams from the network-based communication server. The network-based communication client may then employ facial and/or object recognition on the video streams to provide the user of the communication client with a list of recognized users and/or objects. The user of the communication client may then select one or more recognized users and/or objects. The communication client may then show only the video streams matching the selected users and/or objects.

In other examples, each communication client may employ facial and/or object recognition on only the video stream(s) generated by one or more image capture devices communicatively coupled to a computing device on which the communication client is executing. In this manner, the computational load of recognizing content features may be split amongst the different computing devices of the network-based communication session. The video stream(s) and an indication of any objects and/or users recognized may be sent to the communication server from each communication client. The communication server may then aggregate the list of users recognized and provide this list for subscription to the communication clients. The communication server may then only send video streams to each particular communication client that shows users and/or objects that the particular communication client has subscribed to.

In yet other examples, the communication server may employ the facial and/or object recognition on all streams of the network-based communication session. The communication server may then aggregate the list of users recognized and provide this list for subscription to the communication clients. Received subscriptions are stored and the communication server may then only send video streams to each particular communication client that shows users and/or objects that the particular communication client subscribed to.

In still yet additional examples, the communication clients may perform a first portion of the object and/or user recognition and the communication server may perform a second portion of the object and/or user recognition. For example, the communication clients may perform a first operation that produces an intermediate result and the communication server may use the video stream and the intermediate result to produce a final result.

Once a user has subscribed to receive video streams containing recognized persons, those video streams are displayed to the user. In some examples, only the video streams containing the selected recognized person may be sent to the users that subscribed to receive that recognized person. In other examples, all the video streams are sent to the client device, but only those that are subscribed are shown. As previously noted, the video stream may be cropped and/or split such that only the recognized person and/or object is shown in a particular video stream and not other people or objects. In other examples, recognized objects adjacent to or used by the recognized person may or may not be included in the video stream depending on the preferences of the users.

As previously noted, the system may automatically deliver or show the video stream with the selected users regardless of which camera the user is recognized from. For example, a user may move from a field of view of a first camera to a field of view of a second camera. The system may recognize this movement and update the transmitted video streams so as to provide subscribers with the proper video streams based upon the subscriptions. For example, a first user subscribes to receive only one video stream showing a second user, and at the time that the first user subscribed to the video stream showing the second user, the second user was recognized in a first video stream. If the second user moves from the first video stream to a second video stream, the system may recognize this change and deliver the second video stream to the first user. In this manner, the system decouples the source of the video stream from the subscription such that the subscription is not a subscription to a particular video source, but rather recognized content of the video streams. The system thus dynamically tracks, across cameras, recognized persons and delivers these streams to users in the communication session.

As previously described, rather than subscribing to individual content features, users can subscribe to receive video streams based upon group memberships of content features. For example, a first user may subscribe to receive video streams showing any user that is part of a particular group of users. In another example, a first user may subscribe to receive video streams showing any object that is part of a particular group of objects.

Users may belong to one or more groups. Groups of users may include a job role within a company, an organization within a company, a hierarchical level within an organization (e.g., a vice president level, a director level, or the like), an ability to make decisions (which may be based upon both their job role, level within the corporate hierarchy, and the subject of the meeting), and the like.

In some examples, groups may be based upon a relationship graph in a social networking service and may be defined based upon the subscribing user e.g., such as $1^{st}$ degree connections of the subscribing user (e.g., friends), 2-nd degree connections (friends of friends), and so on. In order to determine user group membership, the communication system may interact with one or more databases, such as a directory service (such as an Active Directory Service), social networking service, or the like. Users in the meeting may subscribe to receive video streams including users belonging to one or more groups. Each video stream that shows a member of the subscribed groups is sent to the subscribing user.

Groups of objects may be based upon a type of object, for example, writing surfaces (e.g., whiteboards, chalkboards, notepads, and the like). Membership of the group of objects may be based upon an administrator, an object ontology which stores object types and group membership of those objects, and the like.

If a first user leaves the communication session and a second user had subscribed to receive the video feed including that first user then the video stream of that first user may no longer be sent by the communication service to the second user, or may not be displayed by the communication client. Similarly, if a new user belonging to a first group joins the communication service after a second user has already subscribed to a receive streams of the first group, the communication service may still stream the video stream of the new user to the second user.

As noted, groups may be based upon a group membership criteria that is not related to actions taken within the network-based communication session. For example, the group membership may be based upon criteria other than speaking or presenting, within the meeting. In other examples however, the groups may be based upon one or more meeting actions and/or interactions. For example, a group of frequent speakers, a group of arguing participants, participants expressing particular sentiments, participants expressing a particular level of a particular sentiment, participants expressing a threshold level of any sentiment, or the like.

In some examples, the system may provide, along with the video streams, information on the user recognized in the stream. For example, a name, position, contact information, biographical information, and the like. This information may be displayed by the client application, such as in a position adjacent to the video stream, a box that may popup in response to hovering over the video of the user or the like.

As noted, a user may subscribe to receive video streams that feature sentiments or reactions to users. For example, a subscribing user may subscribe to video streams which show other users displaying happiness, sadness, anger, agreement, confusion, or the like. In some examples, the subscription may be for video streams that show users displaying a particular sentiment or emotion that is over a threshold intensity. For example, extreme confusion, extreme happiness, or the like. In some other examples, rather than subscribing to a particular emotion or sentiment, a subscribing user may subscribe to see video streams showing other users that demonstrate emotions and/or sentiments, regardless of their type, that are over a certain intensity level.

In some examples, in order to protect the privacy of users in the network-based communication session, users may have a number of privacy settings that allow the user to control whether or not other users can view their video stream, subscribe to their video stream, and on what basis. For example, users may opt-out of being shown to other users on the basis of facial detection, sentiment analysis, object recognition, group membership, and the like.

By decoupling the video stream source from the actual video stream delivered to a communication client, the system provides users with a simple way of choosing and tracking video streams that provide the user with a more engaging experience. As noted, traditional communication systems present all the video streams—which forces users to sort through a potentially large amount of video streams. This is also very wasteful of networking resources and of processing resources as all streams are sent to all communication clients regardless of whether a particular stream shows content that a particular user is interested in.

Additionally, while some traditional communication systems may allow users the ability to reorganize the streams to focus on one or more particular streams, these systems are still cumbersome for a user to use. Users must sort through a potentially large amount of video streams and reorganize them. Additionally, if the content the user is interested in changes video streams, in traditional communication systems, the user would have to find the new stream where the content is shown and re-reorganize them.

The present disclosure improves the functioning of the computing systems that present the communication systems by allowing users to subscribe to actual content features of video streams rather than the video streams themselves. This may include subscribing to recognized users and/or objects in the communication session by subscribing to their identities or a group identity. The subscribed content features are then tracked by the system to ensure that the video streams delivered to a particular user are updated should the content move to other, different video streams. This provides an improvement to the functioning of the computer system by reducing the amount of network traffic used for a communication session by only sending video to users that the users are interested in receiving rather than every video stream. Some implementations also reduce the processing load of end user client devices in that they no longer have to process and display every stream. Furthermore, for battery operated devices, the reduction in processing load has a corresponding battery savings.

This also represents an improvement to the functioning of the computer system by providing improvements to the user interface of a computing device. For example, the present disclosure describes methods of presenting and summarizing potentially voluminous video stream data during the communication session. The application describes particular manners of selecting and presenting video streams based upon the content of those streams. As previously stated, the present application limits the amount of video streams presented to users based upon their selections and the recognized users in the video streams.

FIG. 1 shows a block diagram of an example network-based communication service 100 according to some examples of the present disclosure. First computing device 110, second computing device 111, third computing device 112, and fourth computing device 113 may be members of a same active network-based communication session (e.g., a video conferencing session) provided by the communication server 130 and the respective instances of communication application 115. First computing device 110 may execute a first instance of a communication application 115 (shown as 115-1), second computing device 111 may execute a second instance of the communication application 115 (shown as 115-2), third computing device 112 may execute a third instance of the communication application 115 (shown as 115-3), and fourth computing device 113 may execute a fourth instance of communication application 115 (shown as 115-4).

Communications applications 115 may communicate with the communication server 130 to setup, join, and participate in the network-based communication session. This includes sending, receiving and presenting one or more of voice, video, and content data that is part of the network-based communication session. In some examples, one or more of the computing devices 110, 111, 112, and 113 may contain or be communicatively coupled to a video capture device, such as a video camera. In some examples, the video capture device may be in the form of a meeting room capture device 105—which is shown in FIG. 1 as being coupled to the first computing device 110. The meeting room capture device 105 may be a camera, a set of cameras, a 360-degree camera, or the like that may capture a large portion of the room.

Figure 8:
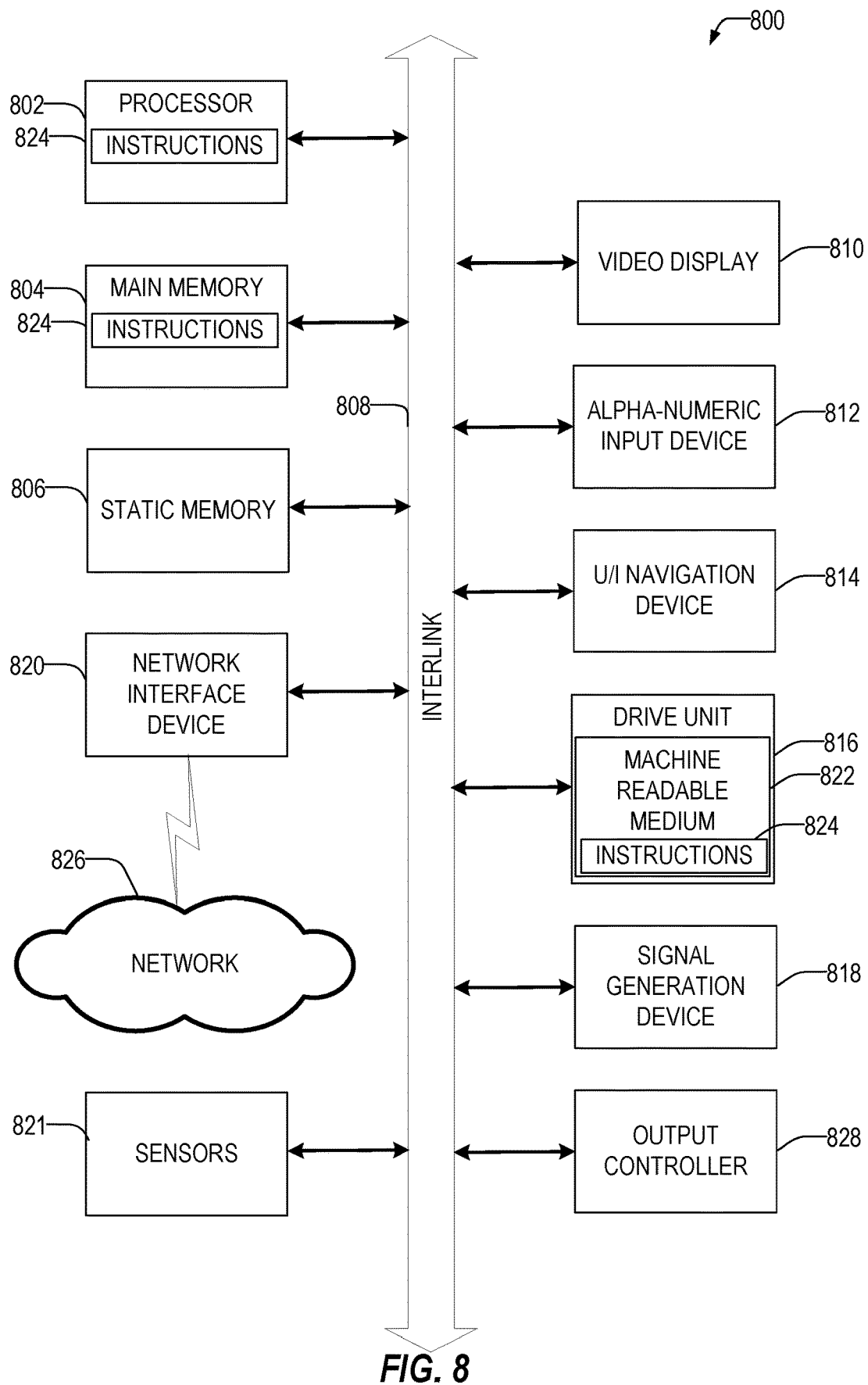
FIG. 8 is a block diagram illustrating an example of a machine upon which one or more embodiments may be implemented according to some examples of the present disclosure.

In some examples, the meeting room capture device 105 may include a processor and/or other computing device components such as shown in FIG. 8. These components may process one or more video streams captured by the one or more cameras, such as stitching, transforming, rotating, cropping, recognizing users through facial recognition, object recognition and identification, and the like. Processing may also include subdividing the captured video stream into multiple video streams based upon the users and/or objects recognized.

One or more video streams from the meeting room capture device 105 may be sent to the first computing device 110 where the communication application 115-1 may receive the video streams and pass them through network 120 to the communication server 130. Communication server 130 may process the one or more video streams to recognize content features such as users and/or objects. Communication server 130 may split a single video stream (such as a video stream showing a 360-degree view) into multiple individual video streams showing each recognized content feature (e.g., user or object) individually.

As previously noted, second computing device 111, third computing device 112, and fourth computing device 113 may execute instances of the communication application 115, denoted as 115-2, 115-3, and 115-4 respectively. These instances of communication application 115 may also communicate with the communication server 130 to setup, join, and participate in a network-based communication session. This includes sending, receiving and presenting one or more of voice, video, and content data that is part of the network-based communication session. Collectively, the communication applications 115 and the communication server 130 provide for the network-based communication session by communicating over the network 120.

Second, third, and fourth computing devices 111, 112, and 113 respectively may or may not be communicatively coupled to a video capture device. As shown in FIG. 1, second computing device 111 and third computing device 112 are coupled to video cameras, however fourth computing device is not coupled to a video camera. Communication server 130 may process the one or more video streams from the first, second, third, and fourth computing devices 110, 111, 112, and 113 respectively. While the fourth computing device 113 is not coupled to a video capture device, the fourth computing device 113 may engage in screen sharing or content sharing of one or more video streams. As noted, the communication server 130 may recognize content features such as objects and/or users in the video. In some examples, communication server 130 may split a video stream into two separate video streams, each video stream showing a single content feature.

First, second, third, and fourth computing devices 110, 111, 112, and 113 may subscribe to receive content of one or more of the video streams sent by the first, second, third, and fourth computing devices 110, 111, 112, and 113 as part of the network-based communication session. As previously noted, in some examples, the communication server 130 may employ content feature recognition (e.g., facial and/or object recognition) on the video streams. In other examples, one or more of the computing devices, such as first computing device 110, second computing device 111, third computing device 112, or fourth computing device 113 may employ content feature recognition to recognize individuals and/or objects in the video streams (e.g., determine their identities) and/or objects (e.g., such as white boards). In still other examples, one of the video capture devices, such as meeting room capture device 105 may employ content feature recognition.

In examples in which the computing devices or the image capture devices that are communicatively coupled to the computing devices employ facial recognition and/or object recognition, those devices send, along with the video streams they generate, a list of objects and/or users shown in the video streams. The communication server 130 may then aggregate a list of all the recognized objects and users and forward the list to the user computing devices. In examples in which the communication server 130 detects and recognizes objects and users, the communication server 130 may determine a list of all objects and/or users in the variously received video streams.

Users may select, through the communication applications (115-1, 115-2, 115-3, and 115-4), one or more of the listed content features such as users and/or objects. This selection may be transmitted back to the communication server 130 where the communication server 130 may track subscriptions for each of the communication applications 115-1, 11502, 115-3, and 115-4. The communication server 130 may then transmit video streams with recognized content features (e.g., recognized users and other objects) that match a subscription submitted by a communication application. For example, if the user of communication application 115-1 subscribed to receive video "John Smith" and John Smith is recognized in a video stream submitted by the third computing device 112, then that video stream is sent to communication application 115-1 for display to the user of communication application 115-1.

In some examples, in order to recognize content features such as users, the system may compare one or more video frames to one or more stored image templates of the content feature. For example, detected faces in a video stream may be compared with a facial recognition template that was registered with the communication server 130 or a different server. Example algorithms may include principal component analysis using eigenfaces, linear discriminant analysis, elastic bunch graph matching using the Fischerface algorithm, hidden Markov models, multilinear subspace learning using tensor representation, support vector machines, and neuronal motivated dynamic link matching. The content feature templates may be stored in a database communicatively coupled to the communication server 130 and/or the computing devices such as first, second, third, and fourth computing devices (110, 111, 112, and 113 respectively).

As previously described, the communication server 130 and/or the first, second, third, and fourth computing devices 110, 111, 112, and 113 may be communicatively coupled to or may include a database with directory information and/or social networking information which may include identity information include names, corporate information, position, and the like for users in the network-based communication session.

While FIG. 1 shows four computing devices, 110, 111, 112, and 113; as can be appreciated, the network-based communication session may include more or less than four computing devices as users.

Figure 2:
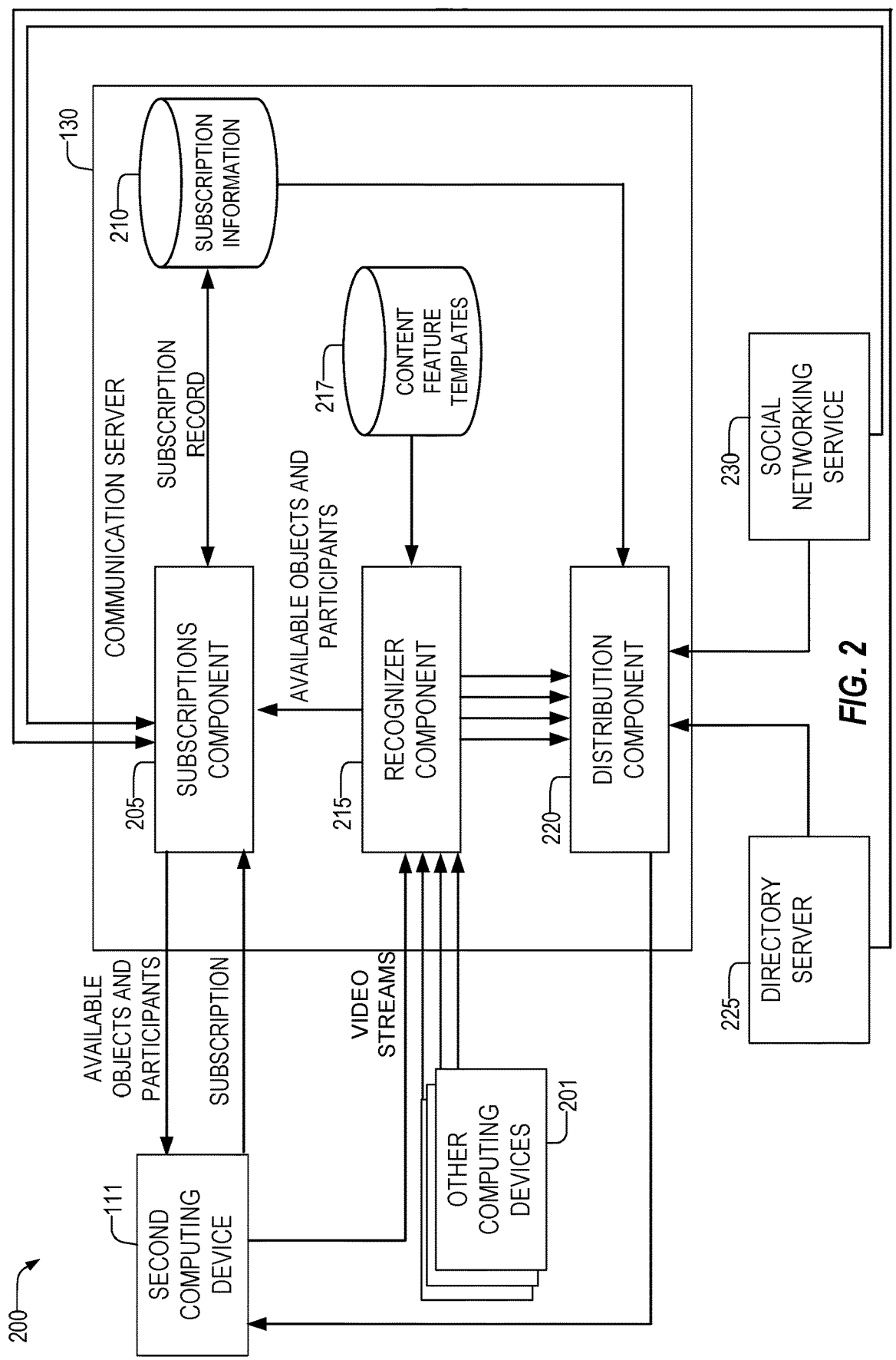
FIG. 2 illustrates a block diagram of a communication server according to some examples of the present disclosure.

FIG. 2 illustrates a block diagram 200 of a communication server 130 according to some examples of the present disclosure. In the block diagram 200, a subscription process and video stream delivery process flow are shown for a single one of the user computing devices—the second computing device 111. Other computing devices 201 (e.g., first computing device 110, third computing device 112, fourth computing device 113 from FIG. 1) are represented as other user computing devices 201 in a network-based communication session.

The subscriptions component 205 manages subscriptions for one or more users of the network-based communication session. In some examples, the subscription is specific to each user and each network-based communication session, but in other examples, the subscription may apply to each user for more than the current network-based communication session (e.g., it may be a setting that is applied until changed by a user). In some examples, the subscription may be made during the network-based communication session, before the network-based communication session, or the like.

Subscription component 205 may send a list of available content features (e.g., objects and/or users) to each user computing device. The list may be based upon a set of recognized content features currently recognized in the video streams of the network-based communication session. In some examples, the list may change as new content features are recognized and as previously recognized content features are no longer recognized (e.g., a user is no longer visible in any video stream). In some examples, an initial list may be provided prior to the start of streaming video that may be based upon the invited users and objects previously detected in a location of one or more of the computing devices (e.g., a whiteboard previously detected in a meeting room that is part of the network-based conference session may be listed). Once the video streaming starts, the list may be updated based upon the actual detected and recognized content features.

Computing devices participating in the network-based communication session (such as the second computing device 111) may receive the list of available content features and present those options to the user. The user may then select from the available options and the communication application uses those selections to formulate and send a subscription request to the subscriptions component 205. Subscriptions component 205 may then store information on the subscription in subscription information data store 210. For example, an identifier of the subscribing user and the content features and groups of content features that the subscribing user is interested in receiving may be stored in the subscription information data store 210.

Subscriptions component may generate the available list of content features sent to the computing devices for selection based upon the content features recognized in the video streams sent by the computing devices (e.g., second computing device 111, other computing devices 201). As previously described, the users may subscribe to content features or content feature groups. For example, the subscriptions component may interface with a database to determine, from the list of recognized content features, groups that the recognized content features belong to. These groups may be added to the list of available subscriptions sent to the computing devices. Example databases may include directory server 225 and social networking service 230.

Recognizer component 215 receives the various video streams from the computing devices and recognizes one or more content features. In some examples, the recognizer component may recognize a plurality of different content features, such as users, objects, and the like. Recognizer component 215 may employ a single recognition algorithm and/or machine-learned model to detect a plurality of different content features. In other examples, recognizer component 215 may employ a different recognition algorithm and/or machine-learned model to detect each of the plurality of content features.

For example, recognizer component 215 may utilize one or more facial recognition (e.g., machine learning algorithms) algorithms that match a detected face to facial recognition templates stored in a content feature template data store 217 to identify a user. As used herein, recognizing users includes determining a unique identifier of the user, such as a name, a data record associated with the user, or the like.

Recognizer component 215 then passes the video streams to the distribution component 220 along with identifiers that indicate, for each stream, the recognized content features (e.g., the recognized person(s) and/or object(s)). In some examples, if a video stream shows multiple recognized content features (e.g., persons and/or objects), the recognizer component 215 may break the video stream into multiple video streams—each video stream showing a single recognized content feature.

Distribution component 220 accesses the subscription information from the subscription information data store 210, directory information from the directory server 225, and/or social networking information from social networking service 230 along with the indicators for each video stream of the recognized content features (e.g., users and/or objects) to determine which video streams to send to which computing devices. For example, the distribution component 220 may attempt to match, for each particular video stream, either a content feature recognized in the particular video stream to a subscription record for a particular computing device in the subscription information stored in the subscription information data store 210. This comparison also includes checking to see if the content feature recognized is part of a group that a user has subscribed to. If a match is found, the distribution component 220 causes a transmission of the particular video stream to the particular computing device. If a match is not found, the stream may not be sent to any computing devices. One or more streams may be sent to one or more computing devices based upon the subscription. One or more users may match one or more different subscriptions based upon the group membership.

As previously noted, the subscriptions may also be based upon sentiment analysis. For example, a user may subscribe to receive video streams related to user emotions. The user may subscribe to receive video streams of emotions detected of the users, such as happy, sad, frustrated, angry, or the like. In other examples, the user may subscribe to receive strong emotions. For example, the system may detect the emotional responses of users shown in the video streams and quantify a level of expressed emotion. Users may subscribe to receive video streams showing one or more of different emotions above a threshold emotional response level. In some examples, the emotions may be detected by a Dynamic Bayesian Network, Support Vector Machines, and Decision trees. In some examples, emotions may be detected by analyzing the video to detect facial muscle movements and by reference to a facial action coding system (FACS) and emotions linked to FACS action units. Intensity of the emotion may be determined based upon the intensity of the facial muscle movements.

In the example of FIG. 2, only one video stream is sent to the second computing device 111, but it will be appreciated that more than one video stream may be sent to the second computing device 111 and one or more video streams may be sent to one or more of the other computing devices 201 (depending on their subscriptions).

In some examples, a default one or more video streams may be sent to the computing devices in addition to, or in the absence of a specific subscription. For example, an active speaker video stream may be sent before the computing device has otherwise specified the subjects of the video stream they are interested in receiving.

As previously described, the functionality shown in FIG. 2 may be performed at least partially on the second computing device 111 or the other computing devices 201. For example, the functionality of the recognizer component 215, and/or subscriptions component 205 may be performed on one or more of the second computing device 111, or other computing devices 201.

Figure 3:
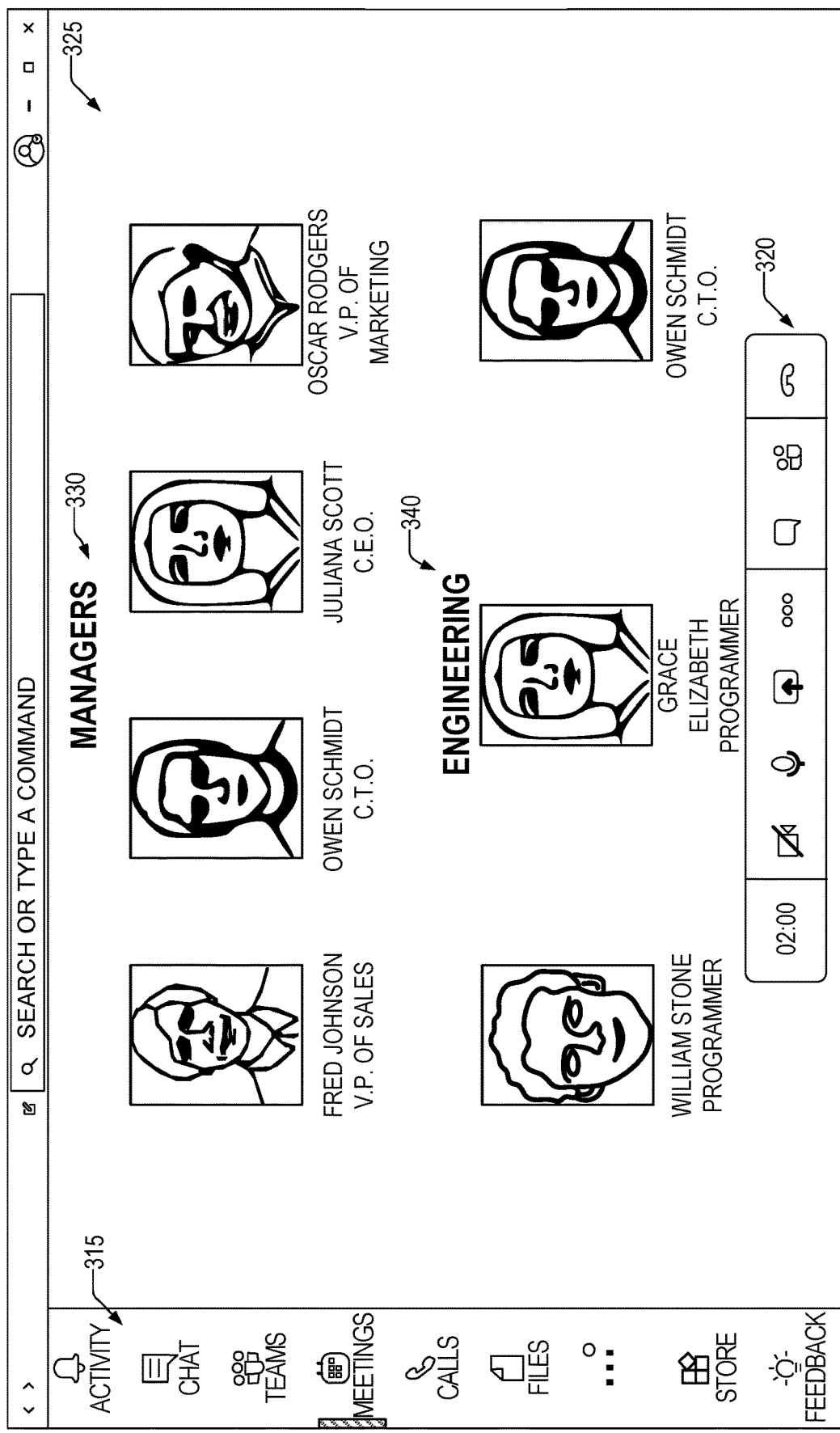
FIG. 3 shows an illustration of an example graphical user interface provided by a communication application for a first user of a network-based communication session according to some examples of the present disclosure.

FIG. 3 shows an illustration of an example graphical user interface 310 provided by a communication application for a first user of a network-based communication session according to some examples of the present disclosure. An icon bar 315 is displayed which allows the user to invoke various functionality of the communication application such as an activity feed, a chat functionality, a group functionality that organizes communications and files by various groups (e.g., teams), a meetings functionality which may provide for network-based communication sessions, a calls functionality that allows users to make and receive voice-over-ip calls, a files organizer, a store where users may obtain additional functionality, a feedback button for allowing the user to submit feedback, and the like. As shown in FIG. 3, the user is currently in a network-based communication session as shown by the indicator to the left of the meetings functionality icon.

Meeting control bar 320 shows such as an elapsed time (02:00) that the meeting has been going on. Meeting control bar 320 may also include video controls, audio controls, sharing controls, recording controls, and the like. Additionally, the meeting control bar 320 may have controls allowing the user to chat with other users using instant messaging, see who is on the call, and hang-up the call. In some examples, and although not shown in FIG. 3, the meeting control bar 320 may have a button for subscribing and unsubscribing to one or more recognized content features such as users, groups of users, objects, or groups of objects. In other examples, the control to subscribe to users, objects, or groups of users and/or objects may be a sub-menu that is displayed upon selection of the ellipsis " . . . " on the meeting control bar 320.

The stage 325 may present one or more representations of users in the meeting or video streams of the users. If the user does not have video streaming enabled or does not have a video capture device, the user may be represented by an avatar. If a user has video enabled and is streaming, the video may be shown on the stage 325. All the users in the meeting shown in FIG. 3 have video enabled. In the example of FIG. 3, the first user whose communication application is shown, has subscribed to receive video streams showing all recognized participants of the meeting that are managers 330 and all recognized participants of the meeting that are engineers 340.

The stage layout may be a grid-layout with each video stream shown in a same size box with the video stream cropped to a head-and-shoulders perspective and aligned with a neighboring video stream in one or more of a row or column. In other examples, each video stream may be in a native resolution. In still other examples, some video streams may be rendered larger as an indication of a relative importance of the user. For example, a speaking user's video stream may be enlarged (regardless of which group the speaker belongs to). In some examples, if the active speaker is not in one of the subscriptions, in addition to the subscribed content features, the active speaker may be shown on the stage as well.

In some examples, the only video streams shown are ones that the user subscribes to. In the example shown in FIG. 3, the user has subscribed to a "managers" group and an "engineering" group. The user may reorganize the ordering and placement of the groups relative to each other. For example, the user may reorganize the stage such that the video streams showing engineers is placed before the managers. In some examples, the user may reorganize the users within the groups. For example, the user may move the user "Grace Elizabeth" to be before "William Stone," in FIG. 3. In some examples, only the subscribed video feeds may be displayed, but in other examples, the subscribed video streams may be prominently placed or featured (e.g., at the top, in the center, a larger size compared to the non-subscribed video streams, or the like) and the non-subscribed video streams may be non-featured. For example, the non-subscribed video streams may be placed below, to the side, may be accessible by scrolling, and may be smaller than the subscribed video streams.

Figure 4:
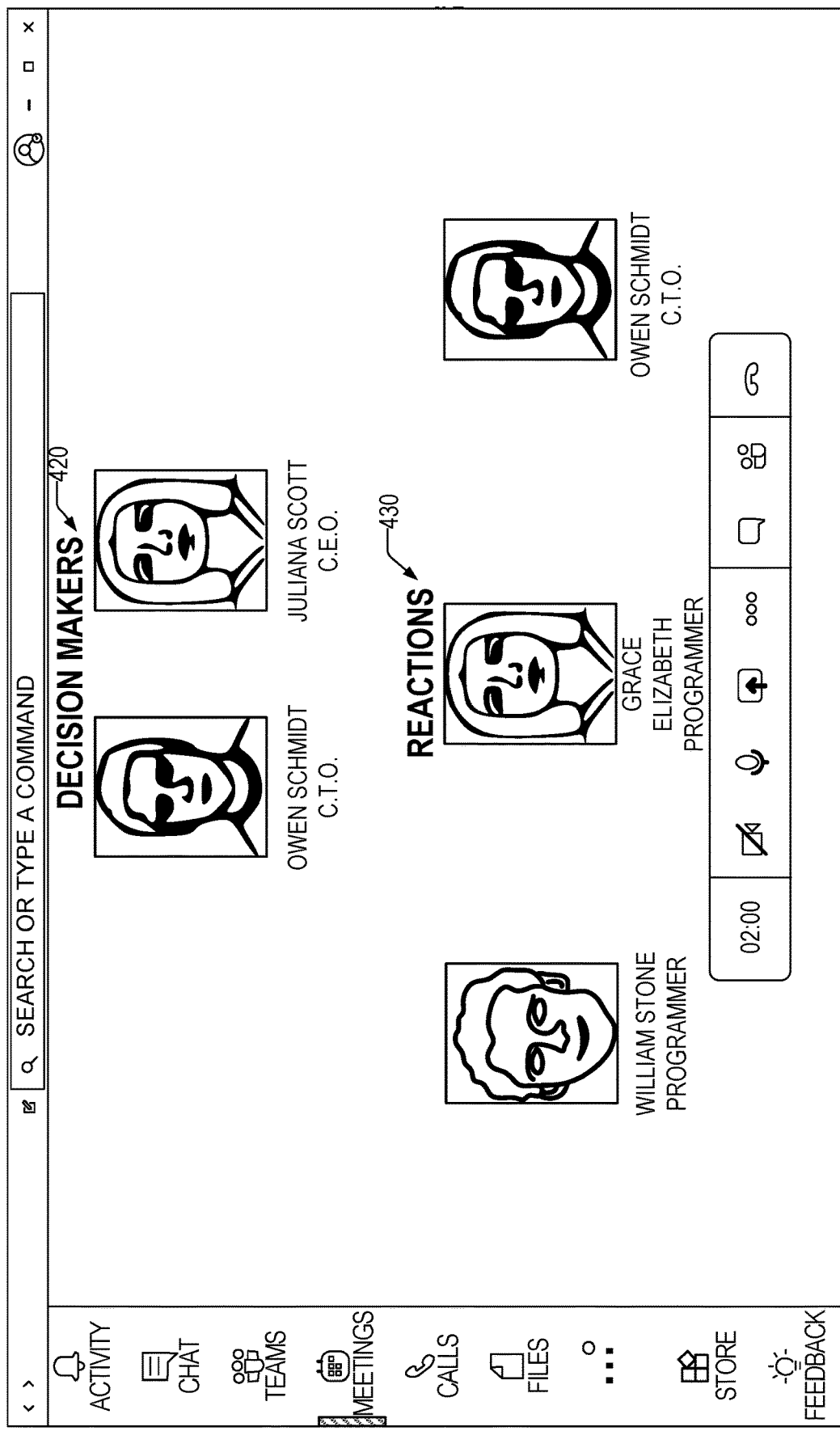
FIG. 4 shows an illustration of an example graphical user interface provided by a communication application for a first user of a network-based communication session according to some examples of the present disclosure.

FIG. 4 shows an illustration of an example graphical user interface 410 provided by a communication application for a first user of a network-based communication session according to some examples of the present disclosure. In the example of FIG. 4, the first user has subscribed to video streams provided by recognized persons who meet the criteria of belonging to the group of decision makers 420 and those that are, or have recently, displayed an emotional reaction 430. Decision makers 420 may be recognized users that, by their membership in a management group, are authorized to make decisions about one or more meeting topics. In some examples, the topic of the meeting may be matched to one or more management groups. For example, meeting topics that relate to engineering may have decision makers that are engineering managers (as opposed to sales or marketing management).

Meeting topics may be determined based upon a meeting subject entered by the creator of the meeting or may be determined through analysis of the content of the meeting (audio, visual, or both). Meeting topics may be keyword matches to a list of keywords that maps those keywords to decision-making users. That is, a groups of engineering managers may have certain keywords associated with them (e.g., stored in a profile) and a meeting with a topic that matches or contains one of the keywords that has one of the engineering managers as a user may trigger the engineering managers that are users to be labeled as decision makers. In other examples, in addition to or instead of keywords, a Latent Dirichlet Algorithm may be utilized to determine a meeting topic. The LDA algorithm may take as input the meeting title, information about the attendees, and in some examples, a transcript of audio of a portion (e.g., a beginning portion) of the meeting. The topic is then used as an index into a database that returns a list of management groups and/or managers that are decision makers for that topic. If one of the returned users are present in the meeting, they may be labelled as a decision maker.

In some examples, the system may automatically subscribe a user to receive video streams of one or more users and/or groups of users. For example, the system may train a machine-learning model to select a particular set of users and/or groups of users. The model may be a general model for all users of the system or may be trained specifically for a group of users or a specific user. The model may take as input a context of the user (e.g., day, time, location, position in the company), the topic of the meeting, identities of other users, group membership of other users, and the like. The model may produce a list of suggested subscriptions, which may be presented to the user. The user may then add or not add subscriptions for the suggested users. The model may be trained based upon past data including a context of the user (e.g., day, time, location, position in the company), the topic of the meeting, identities of other users, group membership of other users, and the like. The past data may be labeled with the list of users that the user subscribed to or a feedback score that the user entered giving a rating to the suggested video streams. Example machine-learning algorithms for creating the model include neural networks, decision trees, decision forests, collaborative filtering, nearest neighbor algorithms, and the like.

Figure 5:
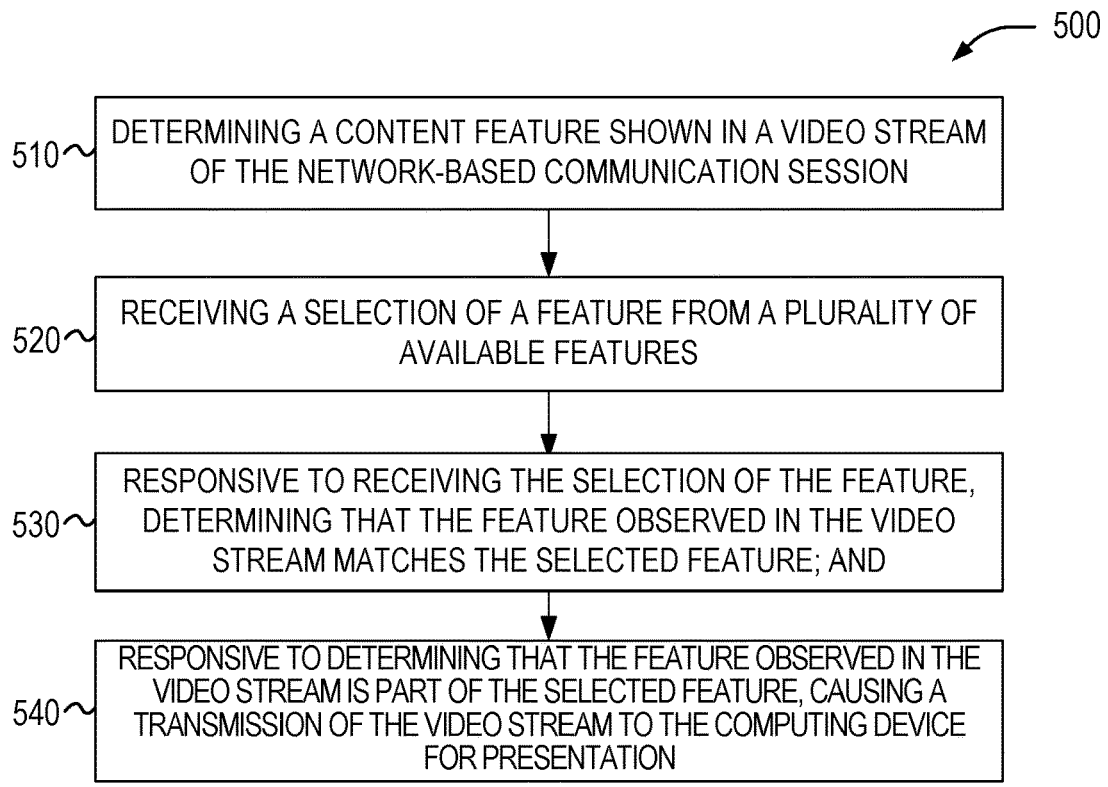
FIG. 5 shows a flowchart of a method for providing content-feature based subscriptions in a network-based communication session according to some examples of the present disclosure.

FIG. 5 shows a flowchart of a method 500 for providing content-feature based subscriptions in a network-based communication session according to some examples of the present disclosure. In some examples, FIG. 5 may be performed by a communication server 130. In other examples, one or more of the operations of FIG. 5 may be performed by communication applications 115 or capture devices, such as meeting room capture device 105.

At operation 510, the system may determine a content feature shown in a video stream of the network-based communication session. For example, a facial recognition algorithm may be applied to detect one or more faces and match them to templates to identify a user shown in the video stream. In other examples, an object recognition algorithm may recognize one or more objects, such as a whiteboard. The determination may be made on the basis of an analysis of one or more frames of the video. In some examples, the analysis may be done by the communication application or a capture device coupled to the communication application and the determination is reading an indication from those devices of the identity of the user, such as by a message sent by the communication application or meta data of the video.

In some examples, an identification of a user in the video stream is independent of an action of a user in the meeting, such as being a speaker. The determined identification may be a unique identifier (either alphanumeric or numeric) for all users of the system. In some examples, the identification is used to query a database (such as an active directory database) to determine information about the user such as a user's name, a user's social media connections, content the user posted recently, or the like. This information may be displayed or otherwise available to a user to view on the stage of the network-based communication system. For example, a user may hover a mouse over a video stream of a user and this information may be displayed.

Communication server 130 may perform operation 510 for each video stream received by the communication server 130 from each communication application 115 that is sending video streams. In some examples, the communication server 130 may gather a list of recognized content features (e.g., users or objects shown in the video streams) and send the list to the communication applications 115.

In some examples, the communication server 130 may determine a plurality of content feature groups that the list of recognized content features belong to and provide those as options for subscription to the communication applications 115. For example, a list of groups that recognized users belong to, a group of objects that non-person objects belong to, and the like. In some examples, the communication server 130 may split a video stream into multiple video streams if the video stream includes multiple recognized content features. For example, if a video stream shows two persons or objects, the communication server 130 may split the video stream into a first portion showing the first person and not the second person and a second portion showing the second person and not the first person.

At operation 520, the communication server 130 may receive a selection of a content feature from a plurality of available content features from a communication application 115. Example content features may include recognized users, groups of users, objects, groups of objects, and the like. The communication server 130 may store information on the subscription, such as which user is subscribed to which other users, objects, user groups, and object groups.

At operation 530, the communication server 130 may, responsive to receiving the selection of the content feature, determine that the content feature observed at operation 510 in the video stream matches the selected feature. For example, if at operation 520, the subscribing user selected a user group and the system determines whether a person recognized at operation 510 is in the selected user group.

At operation 540, responsive to determining that the content feature observed in the video stream at operation 510 matches the selected content feature from operation 520, causing a transmission of the video stream to the computing device for presentation. For example, if a person recognized in the video stream at operation 510 matches a subscription received at operation 520, the video stream may be transmitted to the computing device of the user that subscribed at operation 520. Causing transmission may include transmitting the video stream, instructing another component of the network-based communication session to transmit the video stream, or the like.

As an example application of FIG. 1. at operation 510, the system may determine, based upon an analysis of one or more video frames of a video stream received as part of the network-based communication session, an identity of a person shown in the video stream. The identity may be independent of an action of the person in the network-based communication session. At operation 520 a computing device participating in the network-based communication session may send, and the communication server may receive, a selection of a group of recognized users that was selected from a plurality of available user groups. Responsive to receiving the selection of the user group, the system may, at operation 530, determine that the person observed in the video stream from operation 510 is part of the selected user group from operation 520. At operation 540, responsive to determine that the person observed in the video stream from operation 510 is part of the selected user group from operation 520, causing a transmission of the video stream to the computing device for presentation.

Figure 6:
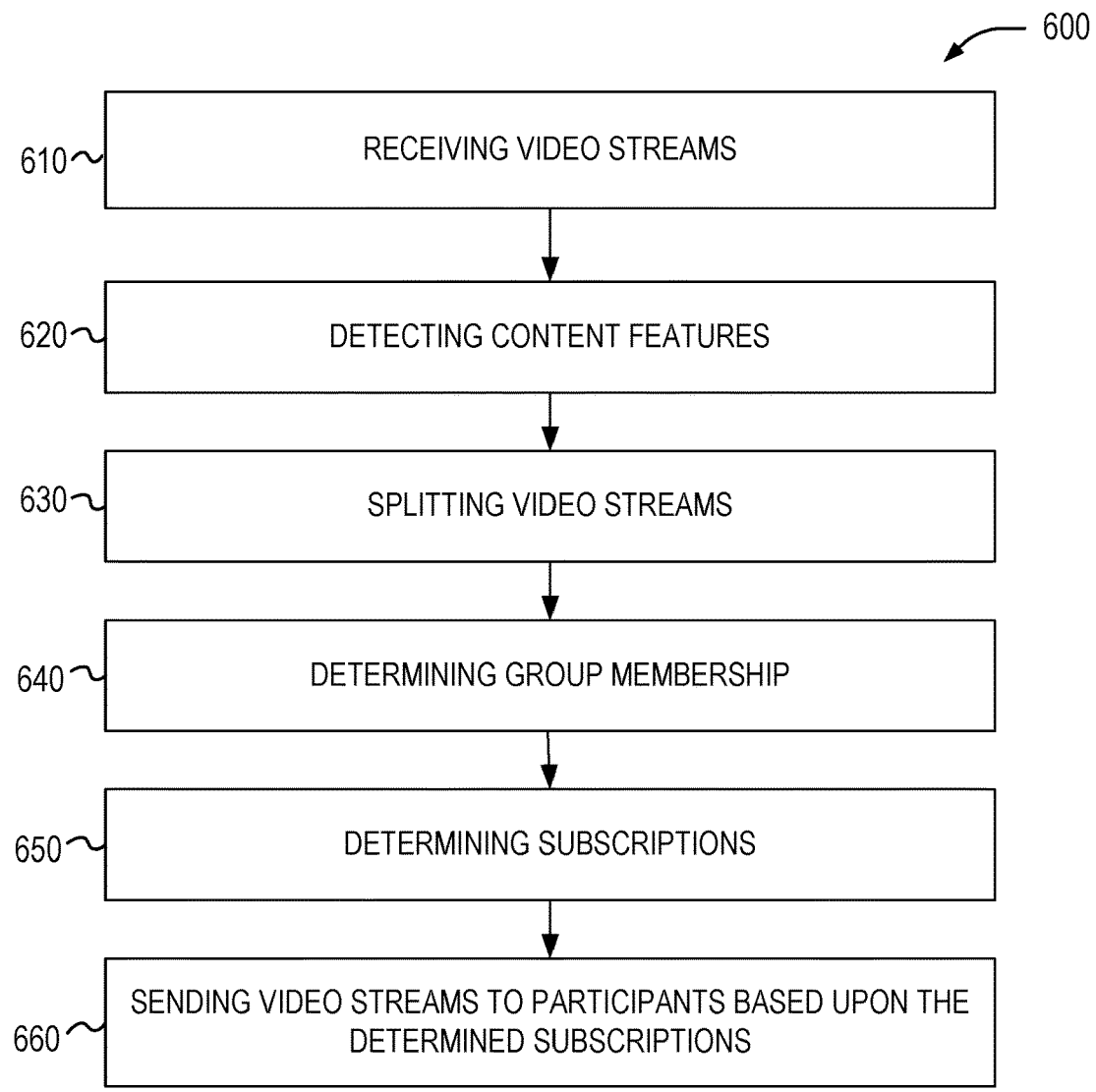
FIG. 6 illustrates a flowchart of a method for providing content-based group subscriptions in a network-based communication session according to some examples of the present disclosure.

FIG. 6 illustrates a flowchart of a method 600 for providing content-based group subscriptions in a network-based communication session according to some examples of the present disclosure. The method 600 may be performed by the communication server 130. In other examples, one or more of the operations may be performed by communication applications 115 or capture devices that are communicatively coupled to the computing devices executing the communication applications 115. At operation 610 the communication server 130 may receive one or more video streams corresponding to the network-based communication session from the communication applications 115. At operation 620 the communication server analyzes the video streams and uses one or more object detection and/or recognition algorithms to detect one or more content features in the video streams. For example, detecting identities of users through facial recognition technologies, detecting objects such as white boards, pictures, models, and the like.

At operation 630 the communication server 130 may split the received video streams from operation 610 into separate video streams showing each of the detected content features from operation 620. For example, if a video stream shows a person and a whiteboard, the system may split that into two separate video streams, one showing the person (and no the whiteboard) and another showing the whiteboard (but not the person). In some examples, instead of cropping out the other detected content features, the video streams may instead apply one or more operations to highlight the particular content features over other features of the video stream. For example, if a video stream has a person and a whiteboard, the system may create two video streams from the video stream. One video stream would frame the video such that the person is featured (e.g., centered in the frame, enlarged, in focus, and/or the like) and the white board is not featured (e.g., not centered, smaller, not in focus, and/or the like). The second video stream may similarly feature the whiteboard but not the person.

At operation 640, the system may determine group memberships for content features detected at operation 620. For example, a record of video streams, including a video stream identifier, and one or more identifiers of the content features, and/or groups that those content features are a part of (such as groups of detected users) may be created and stored. For example, the system may utilize a directory service (such as an Active Directory service), an authentication service, a social networking service, or the like to determine groups that a recognized person belong to. In addition, the video may be analyzed again to determine meeting-based role groups, such as active speakers, sentiment analysis, and the like. Further operations may include determining decision makers, and the like. Non-person content feature groups may be determined using one or more ontologies that classify objects based upon types of objects. The group may be the type of object. For example, a writing surface may include whiteboards, paper, chalkboards, and the like.

At operation 650 the system may determine one or more subscriptions that are active. For example, the system may receive subscription requests and store those requests in a data store. Subscriptions may be for an instance of a communication application 115 or be based upon the user logged into the communication application 115. In the latter case, where the subscription is based upon the user logged in to the communication application, and in examples in which subscriptions may apply to more than one communication session, the user may login to any computing device and the subscriptions may be updated so that the appropriate video streams are sent to the user. Subscription information may be stored in a data store which stores the user or communication application identifier and a list of the content features the user is subscribed to.

At operation 660, the system may, during a network-based communication session, determine the video streams that match each subscription of each user in the network-based communication session and transmit, or cause transmission, of those video streams to each user.

As used herein, a network-based communication session may be a state in which audio and/or video protocols have active connections that were set up and have not been terminated. These protocols carry audio and/or video communications which enable at least two users to send audio and/or video to each other in a substantially real-time fashion. Substantially real-time means any exchange of audio and/or video that arrives at a time it was generated, accounting for expected network, transmission, and reception delays.

Figure 7:
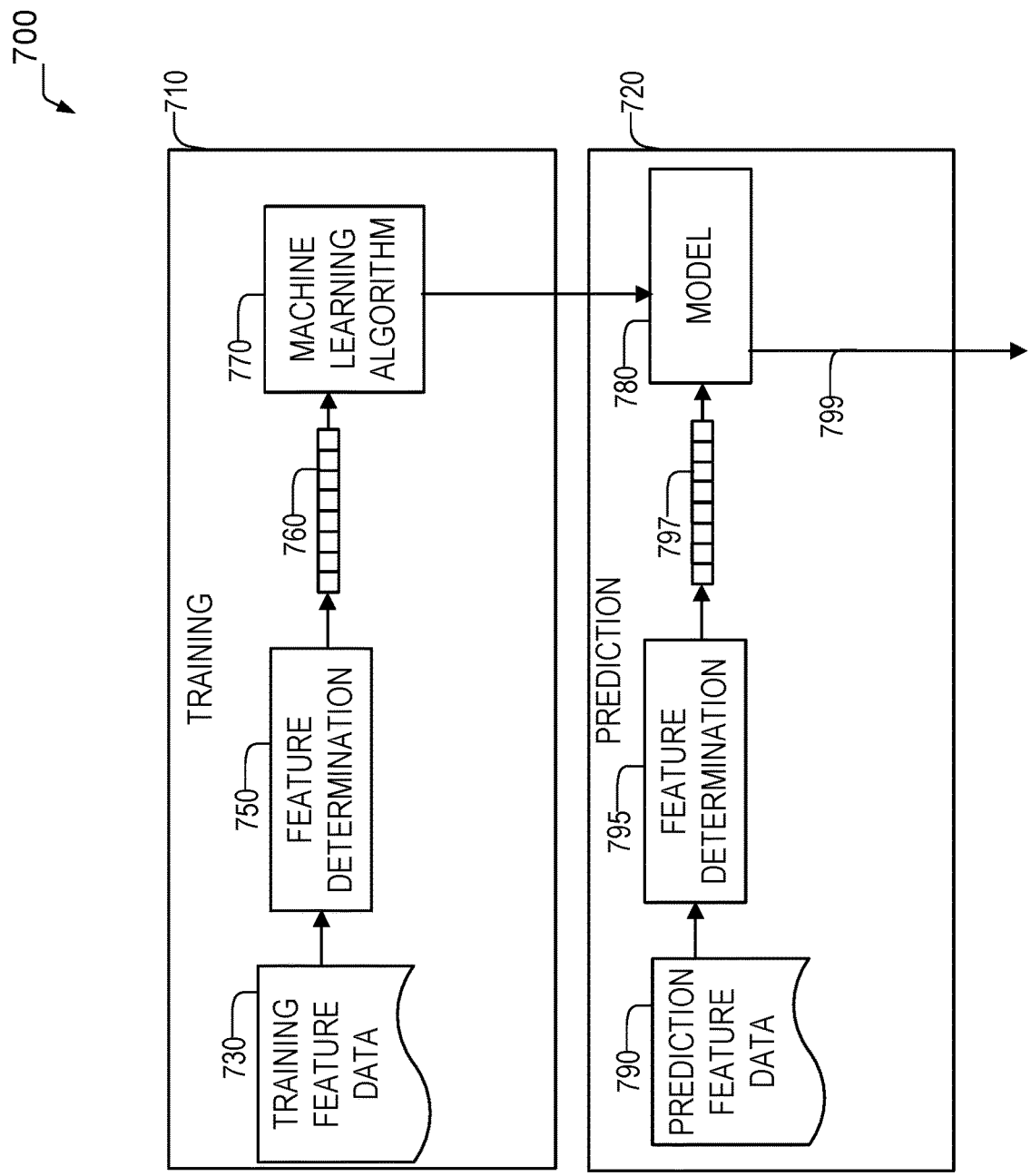
FIG. 7 shows an example machine learning component according to some examples of the present disclosure.

As noted previously various aspects of the present disclosure may utilize one or more machine learning models learned by one or more machine learning algorithms. For example, a one or more content features may be detected in a video stream; one or more suggested subscriptions may be determined; emotions may detected, classified, and an intensity determined; and the like. FIG. 7 shows an example machine learning component 700 according to some examples of the present disclosure. The machine learning component 700 may be implemented in whole or in part by the communication server 130. In some examples, the machine learning component 700 may be implemented in whole or in part by communication application 115. In some examples, the machine learning component 700 may be implemented by a video capture device (such as meeting room capture device 105). In some examples, the training component 710 may be implemented by a different device than the prediction component 720. In these examples, the model 780 may be created on a first machine and then sent to a second machine.

Machine learning component 700 utilizes a training component 710 and a prediction component 720. Training component 710 inputs training feature data 730 into feature determination component 750. The training feature data 730 may be labelled or may be unlabeled. Feature determination component 750 determines one or more features for feature vector 760 from the training feature data 730. Features of the feature vector 760 are a set of the information input and is information determined to be predictive of a desired result. In some examples, the feature determination component 750 is part of the machine learning algorithm 770. For example, features of the training feature data 730 that are not predictive of a result may be ignored or weighted lower than other, more relevant features.

For example, in examples in which the machine learning component 700 is used to detect content features, the feature determination component 750 determines features from the training feature data 730 that are predictive of a determination of an identity of a person or other object. In examples in which the machine learning component 700 is used to suggest content feature subscriptions, the feature determination component 750 may determine features that are predictive of a user's preferences for content features. In examples in which the machine learning component 700 is used to determine emotions and/or levels of emotions the feature determination component 750 may determine features that are predictive of an emotion and/or a level of that emotion.

Features chosen for inclusion in the feature vector 760 may be all the training feature data 730 or in some examples, may be a subset of all the training feature data 730. The feature vector 760 may be utilized (along with any applicable labels) by the machine learning algorithm 770 to produce a model 780.

In the prediction component 720, the prediction feature data 790 may be input to the feature determination component 795. Prediction feature data 790 may be data that is used to make a current prediction and may not be labelled. For example, one or more video frames that are to be analyzed to determine if a content feature is to be recognized; context information of the user to determine suggested subscriptions; and/or one or more video frames that are to be analyzed to determine emotions of a recognized user. Feature determination component 795 may determine the same set of features or a different set of features as feature determination component 750. In some examples, feature determination component 750 and 795 are the same components or different instances of the same component. Feature determination component 795 produces feature vector 797, which are input into the model 780 which produces a prediction 799. Prediction 799 may be an indication of content features recognized, emotions (and levels of emotions) detected, and/or recommended content subscriptions.

The training component 710 may operate in an offline manner to train the model 780. The prediction component 720, however, may be designed to operate in an online manner. It should be noted that the model 780 may be periodically updated via additional training and/or user feedback. The machine learning algorithm 770 may be selected from among many different potential supervised or unsupervised machine learning algorithms. Examples of supervised learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training component 710.

In some examples, the model 780 may output a determination of whether a video stream includes one or more content features. In these examples, the feature data may include one or more video frames, one or more facial recognition templates of users, and the like. The training feature data 730 may be one or more sample video frames labeled with an indication of whether the sample video frame matches one or more of the templates and which one or more templates it matches.

As noted, the model 780 may also output a determination of recommended subscriptions for the user. In these examples, the feature data may be user contexts, meeting contexts, and the like. The training feature data 730 may be historical user contexts, meeting contexts, and the like labelled with past content features (and groups of content features) the user subscribed to given those historical user contexts, meeting contexts, and the like.

In other examples, the model 780 may also detect emotions and/or levels of emotions. In these examples, the feature data may be emotional cues, one or more video frames or features of the video frames, and the like. The training feature data 730 may be sample video frames labelled with emotions and/or emotional levels.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may implement a communication server 130, a computing device (such as first, second, third, or fourth computing devices 110, 111, 112, and 113 of FIG. 1), or the like. The machine 800 may implement the communication server of FIG. 2, the components of FIG. 7, the methods of FIGS. 5 and 6, and produce the GUIs of FIGS. 3 and 4. The machine 800 may take the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is a method of providing a network-based communication session, the method comprising: determining, based upon an analysis of one or more video frames of a video stream received as part of the network-based communication session, an identity of a person shown in the video stream, the determined identity independent of an action of the person in the network-based communication session; receiving from a computing device participating in the network-based communication session, a selection of a user group from a plurality of available user groups; and responsive to receiving the selection of the user group: determining, based upon the identity of the person, that the person observed in the video stream is part of the selected user group; and responsive to determining that the person observed in the video stream is part of the selected user group, causing a transmission of the video stream to the computing device for presentation.

In Example 2, the subject matter of Example 1 includes, determining, based upon an analysis of one or more video frames of a second video stream received as part of the network-based communication session, an identity of a second person shown in the second video stream, the determined identity independent of an action of the second person in the network-based communication session; determining, based upon the identity of the second person, that the second person observed in the second video stream is part of the selected user group; and causing a transmission of the second video stream to the computing device for presentation.

In Example 3, the subject matter of Example 2 includes, determining, based upon an analysis of one or more additional video frames of the second video stream received as part of the network-based communication session, that the second person is no longer shown in the second video stream; and responsive to the determination that the second person is no longer shown in the second video stream, causing a cessation of transmission of the second video stream to the computing device.

In Example 4, the subject matter of Examples 1-3 includes, wherein determining, based upon the analysis of one or more video frames of the video stream received as part of the network-based communication session, the identity of the person shown in the video stream comprises: utilizing a facial recognition technique that matches a face in the video stream to a stored template corresponding to the person.

In Example 5, the subject matter of Examples 1-4 includes, wherein the plurality of available user groups comprises job positions, meeting roles, sentiment types, and meeting roles.

In Example 6, the subject matter of Examples 1-5 includes, determining a plurality of members of the selected user group by querying a directory service.

In Example 7, the subject matter of Examples 1-6 includes, determining a plurality of members of the selected user group by querying a social networking service.

In Example 8, the subject matter of Examples 1-7 includes, receiving a selection of an object type from the computing device; determining a presence of an object of the object type in a second video stream; and responsive to determining the presence of the object of the object type in the second video stream and responsive to receiving the selection of the object type, causing a transmission of the second video stream to the computing device for presentation.

In Example 9, the subject matter of Examples 1-8 includes, wherein causing the transmission of the video stream to the computing device comprises transmitting only the video stream and not a plurality of other video streams that are part of the network-based communication session.

In Example 10, the subject matter of Examples 1-9 includes, determining, based upon the analysis of the one or more video frames of the video stream received as part of the network-based communication session, an identity of a second person shown in the video stream, the identity independent of a role within the network-based communication session; splitting the video stream into a first part and a second part, the first part showing the person and the second part showing the second person; determining, based upon the identity of the second person, that the second person is not part of the selected user group; and wherein causing a transmission of the video stream to the computing device for presentation comprises causing transmission of the first part but not the second part.

Example 11 is a computing device for a network-based communication session, the computing device comprising: a processor; a memory, storing instructions, which when executed, causes the processor to perform operations comprising: determining, based upon an analysis of one or more video frames of a video stream received as part of the network-based communication session, an identity of a person shown in the video stream, the determined identity independent of an action of the person in the network-based communication session; receiving from a computing device participating in the network-based communication session, a selection of a user group from a plurality of available user groups; and responsive to receiving the selection of the user group: determining, based upon the identity of the person, that the person observed in the video stream is part of the selected user group; and responsive to determining that the person observed in the video stream is part of the selected user group, causing a transmission of the video stream to the computing device for presentation.

In Example 12, the subject matter of Example 11 includes, wherein the operations further comprise: determining, based upon an analysis of one or more video frames of a second video stream received as part of the network-based communication session, an identity of a second person shown in the second video stream, the determined identity independent of an action of the second person in the network-based communication session; determining, based upon the identity of the second person, that the second person observed in the second video stream is part of the selected user group; and causing a transmission of the second video stream to the computing device for presentation.

In Example 13, the subject matter of Example 12 includes, wherein the operations further comprise: determining, based upon an analysis of one or more additional video frames of the second video stream received as part of the network-based communication session, that the second person is no longer shown in the second video stream; and responsive to the determination that the second person is no longer shown in the second video stream, causing a cessation of transmission of the second video stream to the computing device.

In Example 14, the subject matter of Examples 11-13 includes, wherein the operations of determining, based upon the analysis of one or more video frames of the video stream received as part of the network-based communication session, the identity of the person shown in the video stream comprises: utilizing a facial recognition technique that matches a face in the video stream to a stored template corresponding to the person.

In Example 15, the subject matter of Examples 11-14 includes, wherein the plurality of available user groups comprises job positions, meeting roles, sentiment types, and meeting roles.

In Example 16, the subject matter of Examples 11-15 includes, wherein the operations further comprise: determining a plurality of members of the selected user group by querying a directory service.

In Example 17, the subject matter of Examples 11-16 includes, wherein the operations further comprise: determining a plurality of members of the selected user group by querying a social networking service.

In Example 18, the subject matter of Examples 11-17 includes, wherein the operations further comprise: receiving a selection of an object type from the computing device; determining a presence of an object of the object type in a second video stream; and responsive to determining the presence of the object of the object type in the second video stream and responsive to receiving the selection of the object type, causing a transmission of the second video stream to the computing device for presentation.

In Example 19, the subject matter of Examples 11-18 includes, wherein the operations of causing the transmission of the video stream to the computing device comprises transmitting only the video stream and not a plurality of other video streams that are part of the network-based communication session.

In Example 20, the subject matter of Examples 11-19 includes, wherein the operations further comprise: determining, based upon the analysis of the one or more video frames of the video stream received as part of the network-based communication session, an identity of a second person shown in the video stream, the identity independent of a role within the network-based communication session; splitting the video stream into a first part and a second part, the first part showing the person and the second part showing the second person; determining, based upon the identity of the second person, that the second person is not part of the selected user group; and wherein causing a transmission of the video stream to the computing device for presentation comprises causing transmission of the first part but not the second part.

Example 21 is a machine-readable storage medium that stores instructions, which when executed by a machine, causes the machine to perform operations comprising: determining, based upon an analysis of one or more video frames of a video stream received as part of a network-based communication session, an identity of a person shown in the video stream, the determined identity independent of an action of the person in the network-based communication session; receiving from a computing device participating in the network-based communication session, a selection of a user group from a plurality of available user groups; and responsive to receiving the selection of the user group: determining, based upon the identity of the person, that the person observed in the video stream is part of the selected user group; and responsive to determining that the person observed in the video stream is part of the selected user group, causing a transmission of the video stream to the computing device for presentation.

In Example 22, the subject matter of Example 21 includes, wherein the operations further comprise: determining, based upon an analysis of one or more video frames of a second video stream received as part of the network-based communication session, an identity of a second person shown in the second video stream, the determined identity independent of an action of the second person in the network-based communication session; determining, based upon the identity of the second person, that the second person observed in the second video stream is part of the selected user group; and causing a transmission of the second video stream to the computing device for presentation.

In Example 23, the subject matter of Example 22 includes, wherein the operations further comprise: determining, based upon an analysis of one or more additional video frames of the second video stream received as part of the network-based communication session, that the second person is no longer shown in the second video stream; and responsive to the determination that the second person is no longer shown in the second video stream, causing a cessation of transmission of the second video stream to the computing device.

In Example 24, the subject matter of Examples 21-23 includes, wherein the operations of determining, based upon the analysis of one or more video frames of the video stream received as part of the network-based communication session, the identity of the person shown in the video stream comprises: utilizing a facial recognition technique that matches a face in the video stream to a stored template corresponding to the person.

In Example 25, the subject matter of Examples 21-24 includes, wherein the plurality of available user groups comprises job positions, meeting roles, sentiment types, and meeting roles.

In Example 26, the subject matter of Examples 21-25 includes, wherein the operations further comprise: determining a plurality of members of the selected user group by querying a directory service.

In Example 27, the subject matter of Examples 21-26 includes, wherein the operations further comprise: determining a plurality of members of the selected user group by querying a social networking service.

In Example 28, the subject matter of Examples 21-27 includes, wherein the operations further comprise: receiving a selection of an object type from the computing device; determining a presence of an object of the object type in a second video stream; and responsive to determining the presence of the object of the object type in the second video stream and responsive to receiving the selection of the object type, causing a transmission of the second video stream to the computing device for presentation.

In Example 29, the subject matter of Examples 21-28 includes, wherein the operations of causing the transmission of the video stream to the computing device comprises transmitting only the video stream and not a plurality of other video streams that are part of the network-based communication session.

In Example 30, the subject matter of Examples 21-29 includes, wherein the operations further comprise: determining, based upon the analysis of the one or more video frames of the video stream received as part of the network-based communication session, an identity of a second person shown in the video stream, the identity independent of a role within the network-based communication session; splitting the video stream into a first part and a second part, the first part showing the person and the second part showing the second person; determining, based upon the identity of the second person, that the second person is not part of the selected user group; and wherein causing a transmission of the video stream to the computing device for presentation comprises causing transmission of the first part but not the second part.

Example 31 is a device for providing a network-based communication session, the device comprising: means for determining, based upon an analysis of one or more video frames of a video stream received as part of the network-based communication session, an identity of a person shown in the video stream, the determined identity independent of an action of the person in the network-based communication session; means for receiving from a computing device participating in the network-based communication session, a selection of a user group from a plurality of available user groups; and responsive to receiving the selection of the user group: means for determining, based upon the identity of the person, that the person observed in the video stream is part of the selected user group; and means for responsive to determining that the person observed in the video stream is part of the selected user group, causing a transmission of the video stream to the computing device for presentation.

In Example 32, the subject matter of Example 31 includes, means for determining, based upon an analysis of one or more video frames of a second video stream received as part of the network-based communication session, an identity of a second person shown in the second video stream, the determined identity independent of an action of the second person in the network-based communication session; means for determining, based upon the identity of the second person, that the second person observed in the second video stream is part of the selected user group; and means for causing a transmission of the second video stream to the computing device for presentation.

In Example 33, the subject matter of Example 32 includes, means for determining, based upon an analysis of one or more additional video frames of the second video stream received as part of the network-based communication session, that the second person is no longer shown in the second video stream; and responsive to the determination that the second person is no longer shown in the second video stream, means for causing a cessation of transmission of the second video stream to the computing device.

In Example 34, the subject matter of Examples 31-33 includes, wherein the means for determining, based upon the analysis of one or more video frames of the video stream received as part of the network-based communication session, the identity of the person shown in the video stream comprises: means for utilizing a facial recognition technique that matches a face in the video stream to a stored template corresponding to the person.

In Example 35, the subject matter of Examples 31-34 includes, wherein the plurality of available user groups comprises job positions, meeting roles, sentiment types, and meeting roles.

In Example 36, the subject matter of Examples 31-35 includes, means for determining a plurality of members of the selected user group by querying a directory service.

In Example 37, the subject matter of Examples 31-36 includes, means for determining a plurality of members of the selected user group by querying a social networking service.

In Example 38, the subject matter of Examples 31-37 includes, means for receiving a selection of an object type from the computing device; means for determining a presence of an object of the object type in a second video stream; and responsive to determining the presence of the object of the object type in the second video stream and responsive to receiving the selection of the object type, means for causing a transmission of the second video stream to the computing device for presentation.

In Example 39, the subject matter of Examples 31-38 includes, wherein the means for causing the transmission of the video stream to the computing device comprises means for transmitting only the video stream and not a plurality of other video streams that are part of the network-based communication session.

In Example 40, the subject matter of Examples 31-39 includes, means for determining, based upon the analysis of the one or more video frames of the video stream received as part of the network-based communication session, an identity of a second person shown in the video stream, the identity independent of a role within the network-based communication session; means for splitting the video stream into a first part and a second part, the first part showing the person and the second part showing the second person; means for determining, based upon the identity of the second person, that the second person is not part of the selected user group; and wherein the means for causing a transmission of the video stream to the computing device for presentation comprises means for causing transmission of the first part but not the second part.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

What is claimed is:

1. A computing device for a network-based communication session, the computing device comprising:
   a processor;
   a memory, storing instructions, which when executed, causes the processor to perform operations comprising:
      determining, based upon an analysis of one or more video frames of one or more video streams received as part of the network-based communication session, an identity of a plurality of persons shown in the video stream, the determined identity independent of an action of the persons in the network-based communication session;
      querying a directory server for group membership information for each of the plurality of persons;
      determining from the identity of the plurality of persons and the group membership information, a plurality of available user groups;
      receiving from a computing device participating in the network-based communication session, a selection of a user group from a plurality of available user groups; and
      responsive to receiving the selection of the user group:
         determining, based upon the identity of the plurality of persons, that at least one of the plurality of persons observed in a particular video stream of the video streams is part of the selected user group; and
         responsive to determining that the at least one of the plurality of persons observed in the video streams is part of the selected user group, causing a transmission of the particular video stream to the computing device for presentation.

2. The computing device of claim 1, wherein the operations further comprise:
   determining, based upon an analysis of one or more video frames of a second video stream of the one or more video streams received as part of the network-based communication session, an identity of a second person shown in the second video stream, the determined identity independent of an action of the second person in the network-based communication session;
   determining, based upon the identity of the second person, that the second person observed in the second video stream is part of the selected user group; and
   causing a transmission of the second video stream to the computing device for presentation.

3. The computing device of claim 2, wherein the operations further comprise:
   determining, based upon an analysis of one or more additional video frames of the second video stream received as part of the network-based communication session, that the second person is no longer shown in the second video stream; and
   responsive to the determination that the second person is no longer shown in the second video stream, causing a cessation of transmission of the second video stream to the computing device.

4. The computing device of claim 1, wherein the operations of determining, based upon an analysis of one or more video frames of one or more video streams received as part of the network-based communication session, an identity of a plurality of persons shown in the video stream comprises:

utilizing a facial recognition technique that matches a face in the video stream to a stored template corresponding to the person.

5. The computing device of claim 1, wherein the plurality of available user groups comprises job positions.

6. The computing device of claim 1, wherein the operations further comprise:
receiving a selection of an object type from the computing device;
determining a presence of an object of the object type in a second video stream of the one or more video streams; and
responsive to determining the presence of the object of the object type in the second video stream and responsive to receiving the selection of the object type, causing a transmission of the second video stream to the computing device for presentation.

7. The computing device of claim 6, wherein the object type is a whiteboard in a room captured by the second video stream.

8. The computing device of claim 1, wherein the operations of causing the transmission of the particular video stream to the computing device comprises transmitting only the particular video stream and not other video streams that are part of the network-based communication session.

9. The computing device of claim 1, wherein the operations further comprise:
determining from an analysis of the particular video stream, an identity of a second person shown in the particular video stream, the identity independent of a role within the network-based communication session;
determining, based upon the identity of the second person, that the second person is not part of the selected user group;
responsive to determining that the second person is not part of the selected user group, splitting the particular video stream into a first part and a second part, the first part showing the at least one of the plurality of persons and the second part showing the second person; and
wherein causing a transmission of the particular video stream to the computing device for presentation comprises causing transmission of the first part but not the second part.

10. A method of providing a network-based communication session, the method comprising:
determining, based upon an analysis of one or more video frames of one or more video streams received as part of the network-based communication session, an identity of a plurality of persons shown in the video stream, the determined identity independent of an action of the persons in the network-based communication session;
querying a directory server for group membership information for each of the plurality of persons;
determining from the identity of the plurality of persons and the group membership information, a plurality of available user groups;
receiving from a computing device participating in the network-based communication session, a selection of a user group from a plurality of available user groups; and
responsive to receiving the selection of the user group:
determining, based upon the identity of the plurality of persons, that the at least one of the plurality of persons observed in a particular video stream of the video streams is part of the selected user group; and
responsive to determining that the at least one of the plurality of persons observed in the video streams is part of the selected user group, causing a transmission of the particular video stream to the computing device for presentation.

11. The method of claim 10, further comprising:
determining, based upon an analysis of one or more video frames of a second video stream of the one or more video streams received as part of the network-based communication session, an identity of a second person shown in the second video stream, the determined identity independent of an action of the second person in the network-based communication session;
determining, based upon the identity of the second person, that the second person observed in the second video stream is part of the selected user group; and
causing a transmission of the second video stream to the computing device for presentation.

12. The method of claim 11, further comprising:
determining, based upon an analysis of one or more additional video frames of the second video stream received as part of the network-based communication session, that the second person is no longer shown in the second video stream; and
responsive to the determination that the second person is no longer shown in the second video stream, causing a cessation of transmission of the second video stream to the computing device.

13. The method of claim 10, wherein determining, based upon an analysis of one or more video frames of one or more video streams received as part of the network-based communication session, an identity of a plurality of persons shown in the video stream comprises:
utilizing a facial recognition technique that matches a face in the video stream to a stored template corresponding to the person.

14. The method of claim 10, wherein the plurality of available user groups comprises job positions.

15. The method of claim 10, further comprising:
receiving a selection of an object type;
determining a presence of an object of the object type in a second video stream of the one or more video streams; and
responsive to determining the presence of the object of the object type in the second video stream and responsive to receiving the selection of the object type, causing a transmission of the second video stream to the computing device for presentation.

16. The method of claim 15, wherein the object type is a whiteboard in a room captured by the second video stream.

17. A device for providing a network-based communication session, the device comprising:
means for determining, based upon an analysis of one or more video frames of one or more video streams received as part of the network-based communication session, an identity of a plurality of persons shown in the video stream, the determined identity independent of an action of the persons in the network-based communication session;
means for querying a directory server for group membership information for each of the plurality of persons;
means for determining from the identity of the plurality of persons and the group membership information, a plurality of available user groups;

means for receiving from a computing device participating in the network-based communication session, a selection of a user group from a plurality of available user groups; and responsive to receiving the selection of the user group:
 means for determining, based upon the identity of the plurality of persons, that the at least one of the plurality of persons observed in a particular video stream of the video streams is part of the selected user group; and
 means for causing a transmission of the particular video stream to the computing device for presentation responsive to determining that the at least one of the plurality of persons observed in the video streams is part of the selected user group.

18. The device of claim 17, wherein the means for causing the transmission of the particular video stream to the computing device comprises means for transmitting only the particular video stream and not a plurality of other video streams that are part of the network-based communication session.

19. The device of claim 17, further comprising:
 means for determining from an analysis of the particular video stream, an identity of a second person shown in the particular video stream, the identity independent of a role within the network-based communication session;
 means for determining, based upon the identity of the second person, that the second person is not part of the selected user group;
 means for splitting the particular video stream into a first part and a second part, the first part showing the at least one of the plurality of persons and the second part showing the second person, responsive to determining that the second person is not part of the selected user group; and
 wherein the means for causing a transmission of the particular video stream to the computing device for presentation comprises means for causing transmission of the first part but not the second part.

20. The device of claim 17, further comprising:
 means for receiving a selection of an object type;
 means for determining a presence of an object of the object type in a second video stream of the one or more video streams; and
 means for causing a transmission of the second video stream to the computing device for presentation responsive to determining the presence of the object of the object type in the second video stream and responsive to receiving the selection of the object type.

* * * * *